United States Patent [19]
Shirai

[11] Patent Number: 4,729,638
[45] Date of Patent: Mar. 8, 1988

[54] LIQUID CRYSTAL-TYPE NONGLARE MIRROR

[75] Inventor: Yoshihiro Shirai, Kashihara, Japan

[73] Assignee: Sharp Kabushiki Kaisha, Osaka, Japan

[21] Appl. No.: 759,824

[22] Filed: Jul. 29, 1985

[30] Foreign Application Priority Data

| Aug. 1, 1984 [JP] | Japan | 59-163271 |
| Aug. 1, 1984 [JP] | Japan | 59-163272 |
| Oct. 12, 1984 [JP] | Japan | 59-214628 |
| Oct. 12, 1984 [JP] | Japan | 59-214629 |

[51] Int. Cl.$^4$ .............................. G02F 1/137
[52] U.S. Cl. .................. 350/339 R; 350/340; 350/341; 350/347 R
[58] Field of Search ............ 350/346, 339 R, 341, 350/340, 347 E, 336, 347 R

[56] References Cited

U.S. PATENT DOCUMENTS

| 3,787,110 | 1/1974 | Berreman et al. | 350/341 |
| 3,912,366 | 10/1975 | Sprokel | 350/338 |
| 4,114,990 | 9/1978 | Mash et al. | 350/341 |
| 4,472,027 | 9/1984 | Okubo et al. | 350/340 |
| 4,563,059 | 1/1986 | Clark et al. | 350/330 |
| 4,579,425 | 4/1986 | Ishii et al. | 350/341 |
| 4,596,446 | 6/1986 | Water et al. | 350/341 |

OTHER PUBLICATIONS

Guyon et al., "Anchoring Properties and Alignment of Liquid Crystals," from *Nonemissive Electrooptic Displays*, Kmetz et al., Ed., 1976, pp. 121–144.

*Primary Examiner*—Bruce Y. Arnold
*Assistant Examiner*—Martin Lerner
*Attorney, Agent, or Firm*—Birch, Stewart, Kolasch & Birch

[57] ABSTRACT

A liquid crystal-type nonglare mirror suitable for room mirrors or for vehicles, which effectively prevents the formation of interference fringes under light sources, such as sodium lamps, halogen lamps and the like. The mirror is composed of a transparent electrode base, a liquid crystal and a reflective electrode base, in which the liquid crystal is placed between the above electrode bases. The technical effects may be provided by the limitation that rubbing directions of both electrodes are nonparallel and that the twist angle of the liquid crystal is about 360°. The technical effects may also be obtained from the insertion of a silicon nitride layer in the construction of the mirror.

4 Claims, 7 Drawing Figures

LIQUID CRYSTAL-TYPE NONGLARE MIRROR

FIELD OF THE INVENTION

The present invention relates to a nonglare mirror, especially a liquid crystal-type nonglare mirror, for use with a room mirror, a mirror for vehicles, or the like.

BACKGROUND OF THE INVENTION

There have been provided liquid crystal-type nonglare mirrors in which a guest-host liquid crystal is placed between a transparent electrode base and a reflective electrode base. These conventional mirrors have a defect of forming interference fringes. Such interference fringes do not occur often under light sources which release light having a wide range of wavelengths, such as sunlight, but can often occur under monochromatic light sources such as sodium lamps (which may be found in tunnels or over highways), mercury lamps (which may be found over highways), or halogen lamps of automobiles.

SUMMARY OF THE INVENTION

Therefore, the present invention provides a liquid crystal-type nonglare mirror which does not have the above-mentioned defect.

The first object of the present invention is to provide a liquid crystal-type nonglare mirror comprising a guest-host liquid crystal, a transparent electrode base and a reflective electrode base, in which the rubbing directions of two electrodes bases, between which the liquid crystal is sandwiched, are nonparallel and the twist angle of the liquid crystal is about 360°. The treatment for orientation of the bases is for homogeneous orientation. Preferably, a front substrate of the transparent electrode base may have a microscopically rough surface and the bottom substrate of the reflective electrode base may have a flat surface.

The second object of the present invention is to provide a liquid crystal-type nonglare mirror comprising a liquid crystal between a transparent electrode base and a reflective base, in which the transparent electrode base is composed of a transparent electrode formed from ITO film, a silicon nitride insulation layer and a polyimide orientation layer. The reflective substrate of the above nonglare mirror may be preferably composed of the transparent electrode formed from ITO film, the silicon nitride insulation layer and the polyimide orientation layer. The front substrate of the transparent electrode base may have a microscopically rough surface and the bottom substrate of the reflective electrode base may have a flat surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

According to the present invention, the nonglare mirror is composed of the transparent electrode base, the liquid crystal and the reflective electrode base. The liquid crystal is placed between the transparent electrode base and the reflective electrode base. The liquid crystal is usually a guest-host type which comprises nematic, chiralnematic or cholesteric liquid crystal in connection with a dyestuff.

The transparent electrode base is usually composed of a front substrate, a transparent electrode and an orientation layer. The reflective electrode base is usually composed of a bottom substrate, a reflective electrode and another orientation layer. The reflective electrode is usually composed of a combination of a transparent electrode with a metal layer for reflection. The front substrate and the bottom substrate are usually made of soda glass, borosilicate glass, a plastic film and the like. The transparent electrode is made of ITO film. The orientation layer is usually made of an organic or inorganic material, such as polyimide and the like.

In the first embodiment, the orientation treatment is for homogeneous alignment and the rubbing directions of both bases are not parallel. The twist angle of the liquid crystal is approximately 360°. In this embodiment, a glass plate which has a microscopically rough surface can be preferably used as the front substrate and a flat glass plate can be used as the bottom substrate. These glass plates prevent interference fringes and also prevent distortion of the reflected image.

In the second embodiment, a silicon nitride insulation layer is inserted between the transparent electrode and the orientation layer to form a transparent electrode base. The construction of this transparent electrode base can be preferably used as a reflective electrode base. The insertion of the silicon nitride insulation layer results in a reduction of reflected light from the transparent electrode base or the reflective electrode base, thus preventing the phenomenon of interference fringes. The reduction of reflected light also increases the difference of the reflection factor when the electric field is turned on and off. The orientation layer, especially a polyimide layer, is very soft. Due to this softness, leaks of an electroconductive material contained in layers may develop when the polyimide orientation layer is directly formed on the electrode. However, the insertion of the silicon nitride insulation layer can effectively prevent such leaks.

In the third embodiment, the particular glass plates mentioned in the first embodiment can be employed as the front substrate and the bottom substrate and therefore improve the cut off of interference fringes.

The invention is illustrated based on the following examples.

EXAMPLE 1

Figure 1:
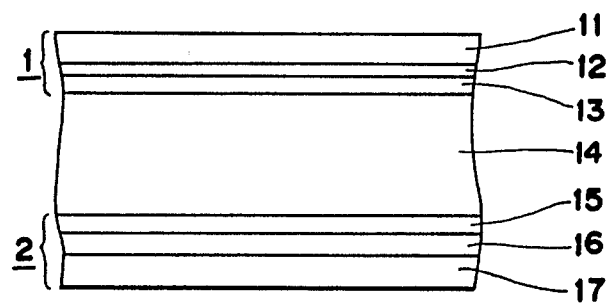
FIG. 1 is a cross section which shows the construction of a first embodiment of the present invention.

In FIG. 1, a transparent electrode base 1 is composed of a front substrate 11, a transparent electrode 12 and an orientation layer 13, in which the transparent electrode 12 is sandwiched between the front substrate 11 and the orientation layer 13. The liquid crystal 14 which is placed between the transparent electrode base 1 and a reflective electrode base 2, has a phase transition type guest-host liquid crystal, which is in homogeneous alignment by the orientation layer 13 and 15.

The reflective electrode base 2 is composed of a bottom substrate 17, a reflective electrode 16 and the other orientation layer 15, in which the reflective electrode 16 is sandwiched between the bottom substrate 17 and the other orientation layer 15. The other orientation layer 15 contributes to the orientation of the liquid crystal 14.

Figure 2:
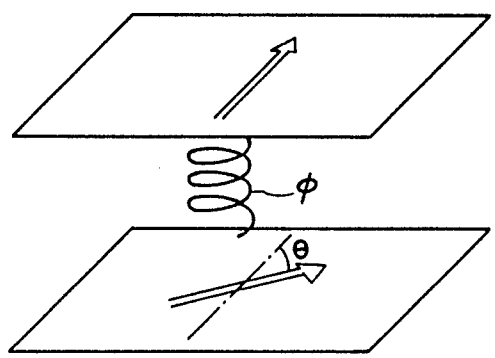
FIG. 2 and FIG. 3 illustrate schematically the relation of an angle $\theta$ between rubbing directions of both bases to a twist angle $\phi$ of the liquid crystal.

In the above construction, an angle $\theta$ is defined as an angle between rubbing directions of the base 1 and 2, and $\phi$ is defined as a twist angle of the liquid crystal which has a granjean texture, as shown in FIG. 2.

Anisotropy of the strength of interference fringes and the strength of interference fringes was measured according to variation of $\theta$ and $\phi$. The result is shown in Table 1.

TABLE 1

|  | $\theta = 90$ $\phi = 90$ | $\theta = 0$ $\phi = 180$ | $\theta = 0$ $\phi = 360$ | $\theta = 180$ $\phi = 360$ | $\theta = 40$ $\phi = 270$ |
|---|---|---|---|---|---|
| Anisotropy in strength of interference fringes | not existent | existent | existent | existent | not existent |
| Strength of interference fringes | slightly weak | slightly weak in particular direction | weak in particular direction | weak in particular direction | strong |

According to this result, the strength of interference fringes was, when it was measured under a sodium lamp, lowered at $\phi = 360°$ for a particular direction. Therefore, it was found that when this particular direction was directed toward a driver's eyes to reduce the phenomenon of interference fringes, the mirror ($\theta = 0°$ and $\phi = 360°$) was not suitable because the liquid crystal becomes cloudy when the electric field was turned off. As a result, $\theta$ has to be 180°, namely rubbing directions of both base must be nonparallel.

Figure 3:
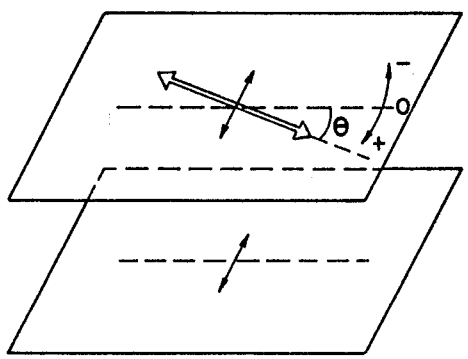

This particular direction will be explained according to FIG. 3.

When the liquid crystal is dextrorotatory, like cholesteric chloride, the direction in which the interference fringe phenomenon becomes invisible is $\phi = +10°$ to $+50°$. The direction is shown by a big arrow in FIG. 3 and $\phi$ is expressed as the positive angle from a direction which is rectangular to the rubbing direction (shown as a thin arrow). On the other hand, when the liquid crystal is levorotatory, like cholesteric nonanate, the direction range is $\phi = -20°$ to $+20°$.

EXAMPLE 2

In a nonglare mirror having a phase transition-type guest-host liquid crystal, a front substrate of a transparent electrode base and a bottom substrate of a reflective electrode base were varied with the following materials:

(1) Colburn type soda-lime glass;
(2) Float type soda-lime glass;
(3) Fusion type borosilicate glass. The obtained mirrors were subjected to the test of degree in occurrence of interference fringes and degree of distortion of the reflected image. The result is shown in Table 2.

TABLE 2

|  | A | B | C | D |
|---|---|---|---|---|
| Front substrate | (1) | (2) or (3) | (1) | (2) or (3) |
| Bottom substrate | (1) | (2) or (3) | (2) or (3) | (1) |
| Degree in occurrence of interference fringes | O | X | O | X |
| Degree of distortion of reflected image | X | O | O | X |

As is shown in Table 2, the combination C was the most suitable for a nonglare mirror.

Details of the combination C are described with reference to FIG. 4.

Figure 4:
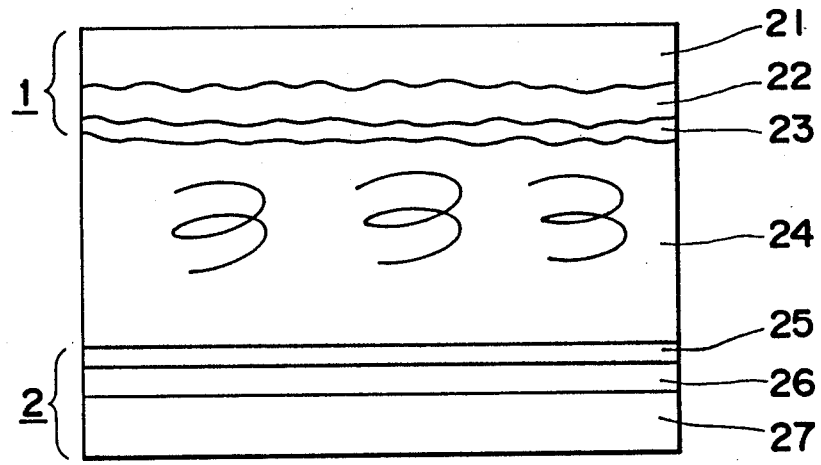
FIG. 4 is a cross-sectional view schematically showing the use of particular glass as the front substrate and the bottom substrate.

In FIG. 4, the transparent electrode base 1 is composed of the front substrate 21, a transparent electrode 22 and an orientation layer 23 made of polyimide, in which the transparent electrode 22 is placed between the front substrate and the orientation layer 23. The front substrate is made of Colburn type soda-lime glass, which is microscopically rough on the inside surface. The polyimide orientation layer 23 contributed to the homogeneous orientation of liquid crystal molecules. The liquid crystal layer 24 is sandwiched between the orientation layer 3 and the other orientation layer 25 which also contributed to the orientation of liquid crystal molecules. A reflective electrode 26 is formed on the orientation layer 25 and the bottom substrate 27 is placed on the reflective electrode 26, thus forming the reflective electrode substrate 2. The bottom substrate is made of float type soda-lime glass or Fusion type borosilicate glass, the surface of which is flat. The electrodes are rubbed in a particular direction.

EXAMPLE 3

This example illustrates a nonglare mirror having a silicon nitride layer between a transparent electrode and an orientation layer. The construction of this mirror is described according to FIG. 5.

Figure 5:
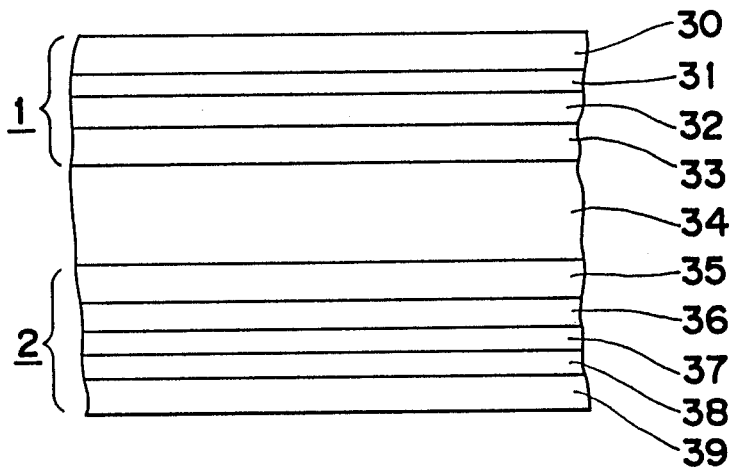
FIG. 5 is a cross-sectional view schematically showing a second embodiment of the present invention.

In FIG. 5, a transparent electrode base 1 is formed from a front substrate 30, the transparent electrode 31, the insulation layer 32 and a polyimide orientation layer 33, respectively. On the other hand, a reflective electrode base 2 is formed from a bottom substrate 39, a Cr layer 38, a reflective electrode 37, a silicon nitride insulating layer 36 and the other polyimide orientation layer 35, respectively. The Cr layer is inserted for enhancing adherent property, but a construction without this Cr layer is possible. A guest-host liquid crystal 34 is sandwiched between the above orientation layers 35 and 33.

Nonglare mirrors having the above construction but having different thickness of each layer were subjected to a test of degree in occurrence of interference fringe and reflection factor. For contrast, the transparent electrode substrate without the silicon nitride insulation layer 13 was also subjected to the same tests. The results are shown in Table 3.

TABLE 3

|  | A[1] | B[2] | C[3] | contrast[4] |
|---|---|---|---|---|
| Degree in occurrence of interference fringes | very few | very few | very few | few |
| Reflection factor[5] | 15/40 | 15/40 | 15/40 | 15/38 |

[1](Transparent electrode substrate)
ITO layer (200Å)-silicon nitride layer (500Å)-Polyimide orientation layer (700Å)
(Reflective electrode substrate)
Al layer (1500Å)-or Cr layer (300Å) + Al layer (1200Å)-silicon nitride layer (400Å) polyimide orientation layer (600–700Å)
[2](Transparent electrode substrate)
ITO layer (300Å)-silicon nitride layer (400Å)-Polyimide orientation layer (700Å)
(Reflective electrode substrate)
Same as the above[1]
[3](Transparent electrode substrate)
ITO layer (400Å)-silicon nitride layer (300Å)-Polyimide orientation layer (700Å)
(Reflective electrode substrate)
Same as the above[1]
[4]Transparent electrode substrate;
ITO layer (200Å)-orientation layer (1100Å)
(Reflective electrode substrate)
Same as the above[1]
[5]Reflection factor:
$T_{off}$: reflection factor (%) when the electric field turned on.
$T_{on}$: reflection factor (%) when the electric field turned off.

As is shown in Table 3, the occurrence of interference fringes is very minor in the mirror of the present invention.

In the above embodiment, the total thickness of ITO layer and silicon nitride layer is 700 Å, but these layers may be within the range of 500 to 1000 Å.

In the above embodiments, the silicon nitride layer has been placed between the reflective electrode and the polyimide orientation layer, but it can be eliminated.

EXAMPLE 4

This examples illustrates a nonglare mirror having a silicon nitride layer between a transparent electrode and an orientation layer in both electrode bases. The construction of this mirror is described according to FIG. 6.

Figure 6:
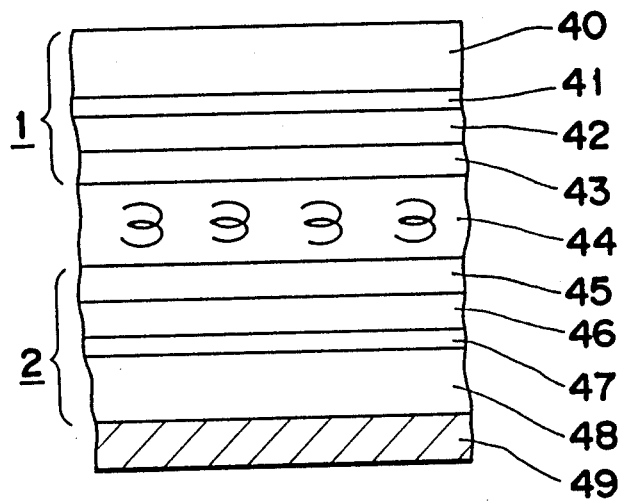
FIG. 6 is a cross-sectional view schematically showing the nonglare mirror in which the reflective electrode base has the same construction as the transparent electrode base.

In FIG. 6, a transparent electrode base 1 is formed from a front substrate 40, a transparent electrode 41, an insulation layer 42 and a polyimide orientation layer 43, respectively. Similarly, a reflective electrode base 2 is formed from a bottom substrate 48, a transparent electrode 47, a silicon nitride insulation layer 46 and the other polyimide orientation layer 45, respectively. A guest-host liquid crystal 44 is sandwiched between the above orientation layers 45 and 43. Numeral 49 represents a reflection layer which is formed on the other side of the bottom substrate 48 and which is made of a combination of aluminum film, SiO$_2$ deposited film and a resin layer; or a combination of Al deposited film, SiO$_2$ deposited film and a resin layer.

Nonglare mirrors having the above construction but having different thickness of layers were subjected to a test for the occurrence of interference fringes and reflection factor. For contrast, a mirror having the transparent electrode base without the silicon nitride insulation layer 43 and 46, and the other mirror having SiO$_2$ layer instead of the silicon nitride layer were also subjected to the same tests. The results are shown in Table 4.

TABLE 4

|  | A[1] | B[2] | C[3] | contrast I[4] | contrast II[5] |
|---|---|---|---|---|---|
| Degree in occurrence of interference fringes | very few | very few | very few | few | few |
| Reflection factor[6] | 15/40 | 15/40 | 15/40 | 15/38 | 15/36 |

[1](Transparent electrode substrate)
ITO layer (200Å)-silicon nitride layer (500Å)-polyimide orientation layer (700Å)
[2](Transparent electrode substrate
ITO layer (300Å)-silicon nitride layer (400Å)-Polyimide orientation layer (700Å)
[3](Transparent electrode substrate)
ITO layer (400Å)-silicon nitride layer (300Å)-polyimide orientation layer (700Å)
[4](Transparent electrode substrate)
ITO layer (200Å)-polyimide orientation layer (1100Å)
[5](Transparent electrode substrate)
ITO layer (200Å)-SiO$_2$ layer (500Å)-polyimide orientation layer (700Å)
[6](Reflection factor)
$T_{off}$: reflection factor (%) when the electrid field was turned on.
$T_{on}$: reflection factor (%) when the electric field was turned off.

As shown in Table 4, very little interference fringing occurs in the mirror of the present invention.

In the above embodiment, the total thickness of ITO layer and silicon nitride layer, and the polyimide orientation layer are 700 Å, respectively, but these layers may be from 500 to 100 Å, respectively.

EXAMPLE 5

This example illustrates another embodiment of the present invention. The construction of this mirror is described according to FIG. 7.

Figure 7:
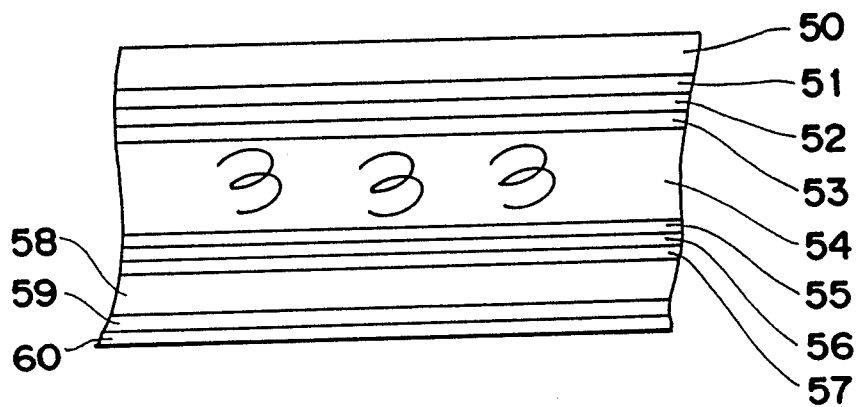
FIG. 7 is a cross-sectional view schematically showing another embodiment of the present invention.

In FIG. 7, a transparent electrode base 1 is formed from a front substrate 50, a transparent electrode 51, an insulation layer 52 and a polyimide orientation layer 53, respectively. On the other hand, a reflective electrode substrate 2 is similarly formed from a bottom substrate 58, a transparent electrode 57, a silicon nitride insulation layer 56 and the other polyimide orientation layer 55, respectively. A guest-host liquid crystal 54 is sandwiched between the above orientation layers 55 and 53. Numeral 54 represents a reflection layer which is formed on the bottom side of the transparent electrode 57 and which is made of aluminum film, SiO$_2$ deposited film and a resin layer; or a combination of Al deposited film, SiO$_2$ deposited film and a resin layer. A protection layer 60 was formed on the reflection layer 59.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal nonglare mirror comprising a guest-host liquid crystal between a transparent electrode base and a reflective electrode base, in which both bases of which rubbing directions are nonparallel are subjected to a treatment for homogeneous alignment and a twist angle of the liquid crystal is about 360° in order to prevent interference fringes.

2. The mirror of claim 1 in which a front substrate is provided for said transparent electrode, said front substrate having a microscopically rough surface and a bottom substrate is provided for the reflective electrode base, said bottom substrate being generally flat.

3. A liquid crystal nonglare mirror for preventing interference fringes comprising a guest-host liquid crystal between a transparent electrode substrate and a reflective electrode substrate, in which at least one of the transparent electrode base and the reflective electrode base is composed of a transparent electrode, a silicon nitride insulation layer and a polyimide orientation layer in this order.

4. The nonglare mirror of claim 3 in which the front substrate of the transparent electrode base has a microscopically rough surface and the bottom substrate of the reflective electrode base is generally flat.

* * * * *